United States Patent [19]
Takemoto

[11] Patent Number: 6,075,069
[45] Date of Patent: Jun. 13, 2000

[54] COLOR INK JET RECORDING METHOD

[75] Inventor: Kiyohiko Takemoto, Suwa, Japan

[73] Assignee: Seiko Epson Corporation, Tokyo-To, Japan

[21] Appl. No.: 08/935,605

[22] Filed: Sep. 23, 1997

[30] Foreign Application Priority Data

Sep. 24, 1996 [JP] Japan .................................... 8-251948

[51] Int. Cl.⁷ ........................... C09D 11/00; C09D 11/02
[52] U.S. Cl. .......................................... 523/160; 106/31.6
[58] Field of Search .................................. 523/160, 161; 347/15, 100; 106/31.27, 31.28, 31.29, 31.3, 31.59, 31.6, 31.61

[56] References Cited

U.S. PATENT DOCUMENTS

| | | | |
|---|---|---|---|
| 5,198,023 | 3/1993 | Stoffel | 106/31.32 |
| 5,428,383 | 6/1995 | Shields et al. | 347/96 |
| 5,439,957 | 8/1995 | Takimoto et al. | 524/101 |
| 5,485,188 | 1/1996 | Tochihara et al. | 347/100 |
| 5,503,664 | 4/1996 | Sano et al. | 524/27 |
| 5,518,534 | 5/1996 | Pearlstine | 106/20 |
| 5,555,008 | 9/1996 | Stoffel | 347/100 |
| 5,560,771 | 10/1996 | Takemoto et al. | 106/31.49 |
| 5,614,007 | 3/1997 | Kurabayashi et al. | 106/31.27 |
| 5,679,139 | 10/1997 | McInerney et al. | 106/31.6 |
| 5,731,825 | 3/1998 | Danzuka et al. | 347/15 |
| 5,734,403 | 3/1998 | Suga et al. | 347/101 |
| 5,735,941 | 4/1998 | Feeman et al. | 106/31.28 |
| 5,738,716 | 4/1998 | Santilli et al. | 106/31.77 |

FOREIGN PATENT DOCUMENTS

| | | |
|---|---|---|
| 0586079 | 3/1994 | European Pat. Off. . |
| 0697445 | 2/1996 | European Pat. Off. . |
| 9118850 | 6/1997 | Japan . |

*Primary Examiner*—Vasu Jagannathan
*Assistant Examiner*—Callie E. Shosho
*Attorney, Agent, or Firm*—Ladas & Parry

[57] ABSTRACT

An ink set and a recording method, especially an ink jet recording method, are provided which can realize a good color image having no significant feathering or bleeding, particularly bleeding derived from color-to-color intermixing. The ink set comprises a yellow ink, a magenta ink, a cyan ink, and optionally a black ink, the cyan ink comprising a resin emulsion, the yellow ink composition and the magenta ink composition comprising a reactant capable of breaking the state of dispersion and/or dissolution of a colorant and the resin emulsion in the cyan ink and the black ink.

17 Claims, No Drawings

COLOR INK JET RECORDING METHOD

BACKGROUND OF THE INVENTION

1. Field of the Invention

The present invention relates to an ink jet recording method, wherein two ink compositions are deposited onto a recording medium, and an ink set used therefor.

2. Background Art

An ink jet recording method is a printing method wherein droplets of an ink composition are ejected and deposited onto a recording medium such as paper. This method has a feature that an image having a high resolution and a high quality can be printed at a high speed with a relatively inexpensive apparatus. In general, the ink composition used in the ink jet recording comprises water as a main component and, added thereto, a colorant and a wetting agent such as glycerin added for prevention of clogging and other purposes.

On the other hand, a new ink jet recording method has been recently proposed which comprises applying a polyvalent metal salt solution onto a recording medium and then applying an ink composition containing a dye material having at least one carboxyl group (see e.g., Japanese Patent Laid-Open No. 202328/1993). The claimed advantage of this method is that polyvalent metal ions combine with the dye to form an insoluble composite which can provide an image having water resistance and a high quality free from color bleeding.

Further, an ink jet recording method has been proposed wherein a first ink composition containing a pH-sensitive dye is used in combination with a second ink composition having such a pH value as will cause precipitation of the pH-sensitive dye (Japanese Patent Laid-Open No. 208548/1993). The claimed advantage of this method is that use of these two ink compositions can realize an image having water resistance and high quality free from color bleeding.

Further, an ink jet recording method has been proposed wherein a color ink containing at least a surfactant or a penetrable solvent and a salt for imparting a penetrating property is used in combination with a black ink which cooperates with the salt to cause thickening or coagulation, thereby providing a high-quality color image having a high image density and free from color bleeding (Japanese Patent Laid-Open No. 106735/1994). More specifically, in this method, two liquids, i.e., a first liquid containing a salt and a second liquid of an ink composition, are printed to provide a good image.

Furthermore, other ink jet recording methods wherein two liquids are printed have been proposed, for example, in Japanese Patent Laid-Open Nos. 240557/1991 and 240558/1991.

SUMMARY OF THE INVENTION

The present inventors have now found that, in an ink jet recording method comprising printing such two liquids, use of in combination two ink compositions having specific compositions can realize a color image free from feathering or bleeding, particularly not having significant bleeding derived from color-to-color intermixing. The present invention has been made based on such finding.

Accordingly, an object of the present invention is to provide an ink set which can yield a good color image.

Another object of the present invention is to provide a recording method using this ink set which can realize a good color image.

According to the first aspect of the present invention, there is provided an ink set comprising a yellow ink composition containing a yellow colorant, a magenta ink composition containing a magenta colorant, and a cyan ink composition containing a cyan colorant, the magenta ink composition and the cyan ink composition each comprising a resin emulsion and/or an inorganic oxide colloid, the yellow ink composition comprising a reactant capable of breaking the state of dispersion and/or dissolution of the colorant and the resin emulsion in the magenta ink composition and the cyan ink composition.

According to the second aspect of the present invention, there is provided an ink set comprising a yellow ink composition containing a yellow colorant, a magenta ink composition containing a magenta colorant, and a cyan ink composition containing a cyan colorant, the cyan ink composition comprising a resin emulsion and/or an inorganic oxide colloid, the yellow ink composition and the magenta ink composition each comprising a reactant capable of breaking the state of dispersion and/or dissolution of the colorant and the resin emulsion in the cyan ink composition.

According to the third aspect of the present invention, there is provided an ink set comprising a yellow ink composition containing a yellow colorant, a magenta ink composition having a lower color density containing a magenta colorant, a magenta ink composition having a higher color density containing a magenta colorant, a cyan ink composition having a lower color density containing a cyan colorant, and a cyan ink composition having a higher color density containing a cyan colorant, the magenta ink composition having a lower color density, and the cyan ink composition having a lower color density each comprising a reactant capable of breaking the state of dispersion and/or dissolution of the colorant in the yellow ink composition, the magenta ink composition having a higher color density and the cyan ink composition having a higher color density.

According to the fourth aspect of the present invention, there is provided an ink set comprising a yellow ink composition containing a yellow colorant, a magenta ink composition having a lower color density containing a magenta colorant, a magenta ink composition having a higher color density containing a magenta colorant, a cyan ink composition having a lower color density containing a cyan colorant, and a cyan ink composition having a higher color density containing a cyan colorant, the yellow ink composition, the magenta ink composition having a lower color density, and the cyan ink composition having a lower color density each comprising a reactant capable of breaking the state of dispersion and/or dissolution of the colorant in the magenta ink composition having a higher color density and the cyan ink composition having a higher color density.

According to the fifth aspect of the present invention, there is provided a recording method using the above ink set of the present invention.

DETAILED DESCRIPTION OF THE INVENTION

Ink Sets According to First and Second Aspects of Invention

The ink sets according to the first and second aspects of the present invention each basically comprise a cyan ink composition. If necessary, it may further comprise a black ink composition. The ink compositions constituting the ink set according to the present invention each comprise at least a colorant, water, and an organic solvent.

In the ink set according to the first aspect of the present invention, the magenta ink composition and the cyan ink composition comprise a resin emulsion and/or an inorganic oxide colloid. When the black ink composition is contained in the ink set, the black ink composition also preferably comprises a resin emulsion and/or an inorganic oxide colloid. Further, in the ink set according to this aspect of the present invention, the yellow ink composition comprises a reactant capable of breaking the dispersion and/or dissolution of the colorant and the resin emulsion and/or the inorganic oxide colloid in the magenta ink composition and the cyan ink composition.

In the ink set according to the second aspect of the present invention, the cyan ink composition comprises a resin emulsion and/or an inorganic oxide colloid. When the black ink composition is contained in the ink set, the black ink composition also preferably comprises a resin emulsion and/or an inorganic oxide colloid. Further, in this aspect of the present invention, the yellow ink composition and the magenta ink composition comprise a reactant capable of breaking the dispersion and/or dissolution of a colorant and the resin emulsion and/or the inorganic oxide colloid in the cyan ink composition.

The ink sets according to the present invention can realize a good color image. A major cause of a deterioration in quality of a color image is uneven color mixing at boundary areas between different colors, i.e., color bleeding. According to the ink composition of the present invention, the color bleeding can be effectively prevented. The ink composition containing a reactant, upon contact on a recording medium with the ink composition containing a colorant and a resin emulsion of which the state of dispersion and/or dissolution is broken by the reactant, agglomerates the colorant and the resin emulsion and the inorganic oxide colloid, after which color mixing caused by flow of the ink composition is prevented.

The ink compositions containing a reactant in the ink set according to the present invention, i.e., the yellow ink composition in the first aspect of the present invention and the yellow and magenta ink compositions in the second aspect of the present invention, each basically comprise a colorant, water, a water-soluble organic solvent, and a reactant.

As described above, the reactant according to the present invention is not particularly limited so far as it can break the state of dispersion and/or dissolution of the colorant and the resin emulsion and/or the inorganic oxide colloid in the ink composition free from the reactant. However, specific examples of preferred reactants usable herein include polyvalent metal salts, polyallylamine, and polyallylamine derivatives.

Preferred examples of a polyvalent metal salt as a reactant include salts which are constituted by divalent or higher polyvalent metallic ions and anions bonded to the polyvalent metallic ions and are soluble in water. Specific examples of polyvalent metallic ions include divalent metallic ions, such as $Ca^{2+}$, $Cu^{2+}$, $Ni^{2+}$, $Mg2+$, $Zn^{2+}$, and $Ba^{2+}$, trivalent metallic ions, such as $Al^{3+}$, $Fe^{3+}$, and $Cr^{3+}$. Anions include $Cl^-$, $NO^{3-}$, $I^-$, $Br^-$, $ClO_3^-$, and $CH_3COO^-$.

In particular, a metal salt constituted by $Ca^{2+}$ or $Mg^{2+}$ provides favorable results in terms of pH of the first solution and the quality of prints.

The concentration of the polyvalent metal salt in the ink composition may be suitably determined so as to attain the effect of providing a good print quality and preventing clogging. It, however, is preferably about 0.1 to 40% by weight, more preferably about 5 to 25% by weight.

According to a preferred embodiment of the present invention, the polyvalent metal salt is constituted by divalent or higher polyvalent metallic ions and nitrate ions or carboxylate ions bonded to the polyvalent metallic ions and is soluble in water.

The carboxylate ions are preferably derived from a saturated aliphatic monocarboxylic acid having 1 to 6 carbon atoms and a carbocyclic monocarboxylic acid having 7 to 11 carbon atoms. Preferred examples of the saturated aliphatic monocarboxylic acid having 1 to 6 carbon atoms include formic acid, acetic acid, propionic acid, butyric acid, isobutyric acid, valeric acid, isovaleric acid, pivalic acid, and hexanoic acid. Among them, formic acid and acetic acid are particularly preferred.

A hydrogen atom(s) on the saturated aliphatic hydrocarbon residue in the monocarboxylic acid may be substituted by a hydroxyl group. Preferred examples of such carboxylic acids include lactic acid.

Preferred examples of the carbocyclic monocarboxylic acid having 6 to 10 carbon atoms include benzoic acid and naphthoic acid with benzoic acid being more preferred.

The polyallylamine and polyallylamine derivative, which may be preferably used as the reactant, are cationic polymers which are soluble in water and can be positively charged in water. Such polymers include, for example, those represented by the following formulae (a), (b), and (c):

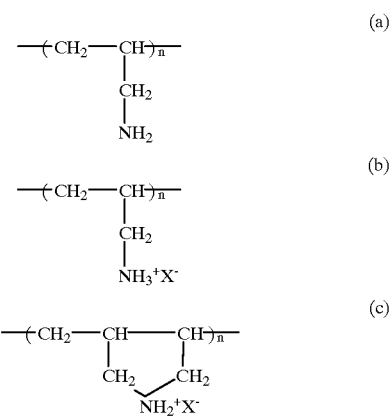

wherein $X^-$ represents chloride, bromide, iodide, nitrate, phosphate, sulfate, acetate or other ion.

In addition, a copolymer of an allylamine with a diallylamine and a copolymer of diallylmethylammonium chloride with sulfur dioxide may also be used.

The content of the polyallylamine and the polyallylamine derivative is preferably 0.5 to 10% by weight based on the ink composition.

Various colorants may be used as the colorant contained in the ink composition containing a reactant in the ink set according to the present invention so far as they are not agglomerated by the reactant. The colorant used in these ink compositions may be either a dye or a pigment. According to a preferred embodiment of the present invention, the above pigment is preferably added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersant.

Preferred example of dispersant include cationic dispersants, anionic dispersants, and nonionic dispersants. Preferred examples of anionic dispersants usable herein include polyacrylic acid, polymethacrylic acid, acrylic acid/ acrylonitrile copolymer, vinyl acetate/acrylic ester copolymer, acrylic acid/alkyl acrylate copolymer, styrene/ acrylic acid copolymer, styrene/methacrylic acid copolymer, styrene/acrylic acid/alkyl acrylate copolymer, styrene/ methacrylic acid/alkyl acrylate copolymer, styrene/α-methylstyrene/acrylic acid copolymer, styrene/α-methylstyrene/acrylic acid/alkyl acrylate copolymer, styrene/maleic acid copolymer, vinylnaphthalene/maleic acid copolymer, vinyl acetate/ethylene copolymer, vinyl acetate/fatty acid/vinylethylene copolymer, vinyl acetate/ maleic ester copolymer, vinyl acetate/crotonic acid copolymer, and vinyl acetate/acrylic acid copolymer. Preferred examples of the anionic dispersant include sodium dodecylbenzenesulfonate, sodium laurate and an ammonium salt of a polyoxyethylene alkyl ether sulfate. Further, preferred examples of the nonionic dispersant include a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide. They may be used alone or as a mixture of two or more. Further, it is also possible to use commercially available nonionic dispersants such as OLFINE Y and Surfynol 82, 104, 440, 465, 485 and TG (all the above products being acetylene glycol and manufactured by Air Products and Chemicals Inc.) and Solsperse 27000 (manufactured by Zeneca Co., Ltd.

According to a preferred embodiment of the present invention, the nonionic dispersant is preferable, especially when a polyvalent metal salt is used as a reactant. The use of the nonionic dispersant can realize a good storage stability of the ink composition. Furthermore, the use of the nonionic dispersant can realize a stable printing for long time in ink Jet printing with a piezoelectric recording head.

According to a further preferred embodiment of the present invention, when the ink composition that contains a reactant include a nonionic dispersant, the ink composition that is free from a reactant preferably include an anionic dispersant.

Specific examples of organic solvents usable herein include high-boiling organic solvents. The high-boiling organic solvent serves to prevent the ink composition from being concentrated due to evaporation, thus preventing clogging of a recording head. Preferred examples of high-boiling organic solvents include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea, 2-pyrrolidone, N-methyl-2-pyrrolidone, 1,3-dimethyl-2-imidazolidinone, and triethanolamine.

Although the amount of the high-boiling organic solvent added is not particularly limited, it is preferably about 0.5 to 40% by weight, more preferably about 2 to 20% by weight.

The reactant-containing ink composition may contain a low-boiling organic solvent as the organic solvent. Preferred examples of low-boiling organic solvents usable herein include methanol, ethanol, n-propyl alcohol, isopropyl alcohol, n-butanol, sec-butanol, tert-butanol, isobutanol, and n-pentanol. Monohydric alcohols are particularly preferred. The low-boiling organic solvent has the effect of shortening the time taken for drying the ink. The amount of the low-boiling organic solvent added is preferably in the range of from 0.5 to 10% by weight, more preferably in the range of from 1.5 to 6% by weight.

According to a preferred embodiment of the present invention, the reactant-containing ink composition may contain a penetrating agent. Penetrating agents usable herein include various surfactants such as anionic, cationic, and amphoteric surfactants; alcohols such as methanol, ethanol, and iso-propyl alcohol; and lower alkyl ethers of polyhydric alcohols, such as ethylene glycol monomethyl ether, diethylene glycol monoethyl ether, diethylene glycol monobutyl ether, triethylene glycol monobutyl ether, propylene glycol monobutyl ether, and dipropylene glycol monobutyl ether.

The ink compositions, containing a resin emulsion and/or an inorganic oxide colloid, constituting the ink set according to the present invention, that is, the magenta and cyan ink compositions in the first aspect of the present invention and the cyan ink compositions in the second aspect of the present invention, each basically comprise a colorant, water, a water-soluble organic solvent, and a resin emulsion and/or an inorganic oxide colloid.

The colorant used in these ink compositions may be either a dye or a pigment so far as the state of the dispersion and/or dissolution can be broken by the reactant. The pigment, however, is preferred.

Dyes usable herein include various dyes commonly used in ink compositions, especially ink jet recording, such as direct dyes, acid dyes, foodstuff dyes, basic dyes, reactive dyes, disperse dyes, vat dyes, soluble vat dyes, and reactive disperse dyes.

Regarding the pigment, inorganic and organic pigments are usable without any particular limitation. Examples of the inorganic pigment include, in addition to titanium oxide and iron oxide, carbon blacks produced by known processes, such as contact, furnace, and thermal processes. Examples of the organic pigment include azo pigments (including azo lake, insoluble azo pigment, condensed azo pigment, and chelate azo pigment), polycyclic pigments (for example, phthalocyanine, perylene, perinone, anthraquinone, quinacridone, dioxazine, thioindigo, isoindolinone, and quinophthalone pigments), dye chelates (for example, basic dye chelates and acid dye chelates), nitro pigments, nitroso pigments, and aniline black.

According to a preferred embodiment of the present invention, the above pigment is preferably added, to the ink, in the form of a pigment dispersion prepared by dispersing the pigment in an aqueous medium with the aid of a dispersant or a surfactant. Preferred dispersants include those commonly used in the preparation of a dispersion of a pigment, for example, polymeric dispersant. Preferred examples of the dispersant may include dispersants listed in connection with the ink composition containing a reactant.

According to a preferred embodiment of the present invention, as described above, the ink composition that is free from a reactant preferably includes an anionic dispersant when the ink composition that contains a reactant includes a nonionic dispersant.

Preferred examples of the anionic dispersant usable herein include polyacrylic acid, polymethacrylic acid, acrylic acid/ acrylonitrile copolymer, vinyl acetate/acrylic ester copolymer, acrylic acid/alkyl acrylate copolymer, styrene/ acrylic acid copolymer, styrene/methacrylic acid copolymer, styrene/acrylic acid/alkyl acrylate copolymer, styrene/ methacrylic acid/alkyl acrylate copolymer, styrene/a-methylstyrene/acrylic acid copolymer, styrene/α-methylstyrene/acrylic acid/alkyl acrylate copolymer, styrene/maleic acid copolymer, vinylnaphthalene/maleic acid copolymer, vinyl acetate/ethylene copolymer, vinyl acetate/fatty acid/vinylethylene copolymer, vinyl acetate/maleic ester copolymer, vinyl acetate/crotonic acid copolymer, and vinyl acetate/acrylic acid copolymer.

According to a preferred embodiment of the present invention, the weight average molecular weight of the copolymer is preferably about 3,000 to 50,000, more preferably about 5,000 to 30,000, most preferably about 7,000 to 15,000.

The dispersant added may be added in any amount so far as the pigment can be stably dispersed and the other effects of the present invention are not lost. According to a preferred embodiment of the present invention, the amount of the dispersant added is preferably in the range of from about 1:0.06 to 1:3, more preferably in the range of from about 1:0.125 to 1:3, in terms of the ratio of the pigment to the dispersant.

In this connection, that the dispersant and the surfactant contained in the dispersion of the pigment function also as the dispersant and the surfactant for the ink composition will be apparent to a person having ordinary skill in the art.

The amount of the pigment added to the ink is preferably about 0.5 to 25% by weight, more preferably about 2 to 15% by weight.

The resin emulsion contained in the ink composition refers to an emulsion comprising water as a continuous phase and the following resin component as a dispersed phase. Resin components as the dispersed phase include acrylic resin, vinyl acetate resin, styrene/butadiene resin, vinyl chloride resin, (meth)acrylate/styrene resin, butadiene resin, styrene resin, crosslinked acrylic resin, crosslinked styrene resin, benzoguanamine resin, phenolic resin, silicone resin, and epoxy resin.

According to a preferred embodiment of the present invention, the resin is a polymer having a combination of a hydrophilic segment with a hydrophobic segment. The particle diameter of the resin component is not particularly limited so far as the resin component can form an emulsion. It, however, is preferably not more than about 150 nm, more preferably about 5 to 100 nm.

The resin emulsion may be prepared by dispersion polymerization of a resin monomer, optionally together with a surfactant, in water. For example, an emulsion of an acrylic resin or a styrene/acrylic resin may be prepared by subjecting an ester of (meth)acrylic acid or alternatively an ester of (meth)acrylic acid in combination with styrene to dispersion polymerization in water in the presence of a surfactant. In general, the mixing ratio of the resin component to the surfactant is preferably about 10:1 to 5:1. When the amount of the surfactant used falls within the above range, it is possible to provide an ink which has good water resistance in the form of an image and good penetrability. The surfactant is not particularly limited. Preferred examples thereof include anionic surfactants (for example, sodium dodecylbenzenesulfonate, sodium laurate and an ammonium salt of a polyoxyethylene alkyl ether sulfate); nonionic surfactants (for example, a polyoxyethylene alkyl ether, a polyoxyethylene alkyl ester, a polyoxyethylene sorbitan fatty acid ester, a polyoxyethylene alkyl phenyl ether, a polyoxyethylene alkylamine, and a polyoxyethylene alkylamide). They may be used alone or as a mixture of two or more. Further, it is also possible to use acetylene glycol (OLFINE Y and Surfynol 82, 104, 440, 465, 485 and TG (all the above products being manufactured by Air Products and Chemicals Inc.).

The ratio of the resin as the component constituting the dispersed phase to water is suitably 60 to 400 parts by weight based on 100 parts by weight of the resin with 100 to 200 parts by weight, based on 100 parts by weight of the resin, of water being preferred.

Known resin emulsions may also be used as the above resin emulsion. For example, resin emulsions described in Japanese Patent Publication No. 1426/1987 and Japanese Patent Laid-Open Nos. 56573/1991, 79678/1991, 160068/1991, and 18462/1992 as such may be used as the resin emulsion in the present invention.

Further, commercially available resin emulsions may also be used, and examples thereof include Microgel E-1002 and E-5002 (styrene/acrylic resin emulsion, manufactured by Nippon Paint Co., Ltd.), Voncoat 4001 (acrylic resin emulsion, manufactured by Dainippon Ink and Chemicals, Inc.), Voncoat 5454 (styrene/acrylic resin emulsion, manufactured by Dainippon Ink and Chemicals, Inc.), SAE-1014 (styrene/acrylic resin emulsion, manufactured by Nippon Zeon Co., Ltd.), and Saivinol SK-200 (acrylic resin emulsion, manufactured by Saiden Chemical Industry Co., Ltd.).

According to a preferred embodiment of the present invention, the amount of the resin emulsion incorporated therein is preferably such that the amount of the resin component is in the range of from 0.1 to 40% by weight, more preferably in the range of from 1 to 25% by weight.

The resin emulsion, by virtue of interaction with the reactant, has the effect of preventing the creation of color bleeding and, at the same time, inhibiting the penetration of a coloring component and, further, accelerating the fixation on the recording medium. Further, some resin emulsions have an additional effect that they form a film on the recording medium to improve the rubbing resistance of the resultant print.

The ink composition used in the present invention may contain an inorganic oxide colloid. Preferred examples of inorganic oxide colloids usable herein include colloidal silica and alumina colloid. These are generally a colloidal solution of ultrafine particles of $SiO_2$, $Al_2O_3$ or the like in water or an organic solvent. Commercially available inorganic oxide colloids are generally such that the dispersion medium is water, methanol, 2-propanol, n-propanol, xylene or the like and the diameter of $SiO_2$, $Al_2O_3$ and other particles is 5 to 100 nm. Further, pH of the colloidal solutions of inorganic oxide is, in many cases, adjusted to the acidic or alkaline side rather than the neutral region. This is because the stable dispersion region of the inorganic oxide colloid is present on the acidic side or the alkaline side. In adding the colloidal solution to the ink composition, pH of the stable dispersion region of the inorganic oxide colloid and pH of the ink should be taken into consideration.

The amount of the inorganic oxide colloid added to the ink composition is preferably 0.1 to 15% by weight, and addition of two or more inorganic oxide colloids is also possible.

According to a preferred embodiment of the present invention, the ink composition comprising a resin emulsion and/or an inorganic oxide colloid preferably comprises an alginic acid derivative. Preferred examples of alginic acid derivatives include alkali metal salts (for example, sodium salt and potassium salt) of alginic acid, organic acid salts (for example, triethanolamine salt) of alginic acid, and ammonium alginate.

The amount of the alginic acid derivative added to the ink composition is preferably about 0.01 to 1% by weight, more preferably about 0.05 to 0.5% by weight.

Although the reason why a good image can be formed by the addition of an alginic acid derivative has not been elucidated yet, it is considered that the reactant, particularly the polyvalent metal salt, reacts with the alginic acid derivative in the ink composition to vary the dispersed state of the colorant, promoting the agglomeration and fixation of the colorant onto the recording medium.

According to a preferred embodiment of the present invention, the ink composition comprising a resin emulsion and/or an inorganic oxide colloid preferably contains an organic solvent. The organic solvent is preferably a low-boiling organic solvent, and preferred examples thereof include methanol, ethanol, n-propyl alcohol, iso-propyl alcohol, n-butanol, sec-butanol, tert-butanol, iso-butanol, and n-pentanol. Monohydric alcohols are particularly preferred. The low-boiling organic solvent has the effect of shortening the time taken for drying the ink.

Further, according to a preferred embodiment of the present invention, the ink composition comprising a resin emulsion and/or an inorganic oxide colloid further comprises a wetting agent comprising a high-boiling organic solvent. Preferred examples of high-boiling organic solvents usable herein include polyhydric alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylolethane, and trimethylolpropane; alkyl ethers of polyhydric alcohols, such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether, and triethylene glycol monobutyl ether; urea; 2-pyrrolidone; N-methyl-2-pyrrolidone; 1,3-dimethyl-2-imidazolidinone; and triethanolamine.

The amount of the wetting agent added is preferably in the range of from 0.5 to 40% by weight, more preferably in the range of from 2 to 20% by weight, based on the ink. The amount of the low-boiling organic solvent added is preferably 0.5 to 10% by weight, more preferably in the range of from 1.5 to 6% by weight, based on the ink.

According to a preferred embodiment of the present invention, the ink composition comprising a resin emulsion and/or an inorganic oxide colloid contains a saccharide. Examples of saccharides usable herein include monosaccharides, disaccharides, oligosaccharides (including trisaccharides and tetrasaccharides), and other polysaccharides, preferably glucose, mannose, fructose, ribose, xylose, arabinose, galactose, aldonic acid, glucitol, sorbitol, maltose, cellobiose, lactose, sucrose, trehalose, and maltotriose. The term "polysaccharide" used herein refers to saccharides, in a broad sense, including substances which widely exist in the natural world, such as alginic acid, a-cyclodextrin, and cellulose.

Derivatives of these saccharides include reducing sugars of the above saccharides (for example, sugar alcohols represented by the general formula $HOCH_2(CHOH)_nCH_2OH$ wherein n is an integer of 2 to 5), oxidized sugars (for example, aldonic acid and uronic acid), amino acid, and thiosugars. Sugar alcohols are particularly preferred, and specific examples thereof include maltitol and sorbitol.

The content of the above saccharide is suitably in the range of from 0.1 to 40% by weight, preferably 0.5 to 30% by weight, based on the ink.

Further, the ink compositions constituting the ink set according to the present invention may, if necessary, contain pH adjustors, preservatives, antimolds and the like.

Ink Set According to Third and Fourth Aspects of Invention

The ink set according to the third or fourth aspect of the present invention comprises a yellow ink composition, two magenta ink compositions different from each other in color density, two cyan ink compositions different from each other in color density, and optionally a black ink composition.

In the third aspect of the present invention, a reactant is added to the magenta ink having a lower color density (hereinafter often referred to as "light-colored magenta ink") and the cyan ink composition having a lower color density (hereinafter often referred to as "light-colored cyan ink"). Further, the fourth aspect of the present invention, a reactant is added to the yellow ink composition, a light-colored magenta ink and a light-colored cyan ink. In the ink set of the third or fourth aspect of the present invention, what is required of the reactant is to break the state of dispersion and/or dissolution of the colorant contained in at least the magenta ink composition having a higher color density, a cyan ink composition having a higher color density, and, the yellow ink composition in the case of the fourth aspect of the present invention, and optionally, the black ink composition.

According to a preferred embodiment of the present invention, in the third and fourth aspects of the present invention, the ink composition that is free from a reactant may include a resin emulsion and/or an inorganic oxide colloid, and the reactant can break the state of dispersion and/or dissolution of the resin emulsion and/or the inorganic oxide colloid. In particular, in the third aspect of the present invention, the yellow ink composition, the magenta ink composition having a higher color density, the cyan ink composition having a higher color density, and, if necessary, the black ink composition comprise a resin emulsion and/or an inorganic oxide colloid. In the fourth aspect of the present invention, the magenta ink composition having a higher color density, the cyan ink composition having a higher color density, and, if necessary, the black ink composition comprise a resin emulsion and/or an inorganic oxide colloid.

As with the ink sets according to the first and second aspects of the present invention, the ink set according to the third and fourth aspects of the present invention can provide a good color image.

Components of the ink compositions constituting the ink set according to the third and fourth aspects of the present invention may be substantially the same as those of the ink compositions constituting the ink sets according to the first and second aspects of the present invention. The difference in color density between ink compositions different from each other in color density may be created by making the dye concentration of one ink composition lower or higher than that of the other ink composition or alternatively by suitably selecting the kind of the colorant used.

Ink Set According to Fifth Aspect of Invention

The ink set according to the fifth aspect of the present invention comprises a yellow ink composition, a magenta ink composition, a cyan ink composition and a black ink composition. Further, the black ink composition comprises a resin emulsion and/or an inorganic oxide colloid, and the yellow ink composition, the magenta ink composition, and cyan ink composition each comprises a reactant capable of breaking the state of dispersion and/or dissolution of the colorant and the resin emulsion in the black ink composition.

As with the ink sets according to the first and second aspects of the present invention, the ink set according to the fifth aspect of the present invention can provide a good color image.

Components of the ink compositions constituting the ink set according to the fifth aspect of the present invention may be substantially the same as those of the ink compositions constituting the ink sets according to the first and second aspects of the present invention.

Ink Jet Recording Method

The ink sets according to the present invention are used in recording methods using an ink composition. Recording methods using an ink composition include, for example, an ink jet recording method, a recording method using writing utensils, such as pens, and other various printing methods. Particularly preferably, the ink compositions according to the present invention are used in the ink jet recording method.

Thus, according to another aspect of the present invention, there is provided an ink jet recording method using the ink set of the present invention. According to the ink jet recording method, the sequence of printing of the ink compositions is not particularly limited. Specifically, the ink composition containing a reactant may be first printed onto a recording medium followed by printing of the ink composition containing a colorant and a resin emulsion which can be agglomerated by the reactant, or vice versa.

According to a preferred embodiment of the present invention, the mass of the droplet of the ink composition ejected is regulated so that the size of a pixel formed by the ink composition that contains a reactant is smaller than a pixel formed by the ink composition that is free from a reactant. More specifically, the mass of the droplet of the ink composition that contains a reactant is preferably less than 30 to 100% by weight of the mass of the droplet of the ink composition that is free from a reactant. This can realize a better image, especially an image with minimized feathering or color bleeding.

EXAMPLES

The present invention will be described in more detail with reference to the following examples, though it is not limited to these examples only.

The following ink compositions were prepared according to a conventional method. Specifically, a colorant component, together with a dispersant component, was dispersed. After other components were added thereto, they were mixed together. Insolubles having a given size or larger were removed by filtration to give an ink composition.

| Yellow ink 1 | |
|---|---|
| C.I. Pigment Yellow 17 | 2 wt % |
| Solsperse 27000 | 1 wt % |
| (nonionic dispersant, manufactured by Zeneca Co., Ltd.) | |
| Sucrose | 0.7 wt % |
| Maltitol | 6.3 wt % |
| Glycerin | 10 wt % |
| 2-Pyrrolidone | 2 wt % |
| Surfynol TG | 1 wt % |
| Magnesium nitrate hexahydrate (reactant) | 5 wt % |
| Pure water | Balance |
| Yellow ink 2 | |
| C.I. Acid Yellow 23 | 3 wt % |
| Diethylene glycol | 10 wt % |
| Surfynol TG | 1 wt % |
| Polyallylamine PAA-10C (reactant, resin component 10%, manufactured Nitto Boseki Co., Ltd.) | 30 wt % |
| Pure water | Balance |
| Yellow ink 3 | |
| C.I. Pigment Yellow 74 | 2 wt % |
| Styrene/acrylic copolymer ammonium salt (nonionic dispersant) | 1 wt % |
| Grandoll Pp-1000 (styrene/acrylic resin emulsion, resin component 45%, manufactured by Dainippon Ink and Chemicals, Inc.) | 5 wt % |
| Alumina Sol 200 ($Al_2O_3$ content 10%, manufactured by Nissan Chemical Industry Ltd.) | 5 wt % |
| Maltitol | 10 wt % |
| Glycerin | 10 wt % |
| 2-Pyrrolidone | 2 wt % |
| Surfynol TG | 1 wt % |
| Pure water | Balance |
| Magenta ink 1 | |
| C.I. Pigment Red 57:1 | 2 wt % |
| Solsperse 27000 (nonionic dispersant) | 1 wt % |
| Sucrose | 10 wt % |
| Glycerin | 5 wt % |
| Triethanolamine | 2 wt % |
| Surfynol TG | 1 wt % |
| Calcium chloride (reactant) | 8 wt % |
| Pure water | Balance |
| Magenta ink 2 | |
| C.I. Direct Red 9 | 3 wt % |
| Diethylene glycol | 10 wt % |
| Surfynol TG | 1 wt % |
| Polyallylamine PAA-10C (reactant) | 30 wt % |
| Pure water | Balance |
| Magenta ink 3 | |
| C.I. Pigment Red 122 | 3 wt % |
| Styrene/acrylic copolymer ammonium salt (anionic dispersant) | 1 wt % |
| Microgel E-5002 (styrene/acrylic resin emulsion, resin component 29.2%, MFT = about 80° C., manufactured by Nippon Paint Co., Ltd.) | 3.5 wt % |
| Sucrose | 0.7 wt % |
| Maltitol | 6.3 wt % |
| Glycerin | 10 wt % |
| 2-Pyrrolidone | 2 wt % |
| Surfynol TG | 1 wt % |
| Pure water | Balance |
| Light-colored magenta ink 1 | |
| C.I. Pigment Red 122 | 0.5 wt % |
| Solsperse 27000 (nonionic dispersant) | 0.3 wt % |
| Diethylene glycol | 10 wt % |
| Surfynol TG | 1 wt % |
| Ammonium hydroxide | 1 wt % |
| Magnesium sulfate tetrahydrate (reactant) | 10 wt % |
| Pure water | Balance |
| Cyan ink 1 | |
| C.I. Direct Blue 199 | 3 wt % |
| Snowtex S (colloidal silica, $SiO_2$ content 30%, manufactured by Nissan Chemical Industry Ltd.) | 5 wt % |
| Diethylene glycol | 10 wt % |
| Surfynol TG | 1 wt % |
| Pure water | Balance |
| Cyan ink 2 | |
| C.I. Direct Blue 199 | 3 wt % |
| Diethylene glycol | 10 wt % |
| Surfynol TG | 1 wt % |

-continued

| | |
|---|---|
| Danfix 723 | 3 wt % |
| (reactant, resin component 35%, manufactured Nitto Boseki Co., Ltd.) | |
| Potassium hydroxide | 1 wt % |
| Pure water | Balance |

Cyan ink 3

| | |
|---|---|
| C.I. Pigment Blue 15:3 | 2 wt % |
| Styrene/acrylic copolymer ammonium salt (anionic dispersant) | 1 wt % |
| Microgel E-5002 | 3.5 wt % |
| Sucrose | 0.7 wt % |
| Maltitol | 6.3 wt % |
| Glycerin | 10 wt % |
| 2-Pyrrolidone | 2 wt % |
| Surfynol TG | 1 wt % |
| Pure water | Balance |

Cyan ink 4

| | |
|---|---|
| C.I. Pigment Blue 15:3 | 2 wt % |
| Solsperse 27000 (nonionic dispersant, manufactured by Zeneca Co., Ltd.) | 1 wt % |
| Magnesium acetate tetrahydrate (reactant) | 5 wt % |
| Sucrose | 0.7 wt % |
| Maltitol | 6.3 wt % |
| Glycerin | 10 wt % |
| 2-Pyrrolidone | 2 wt % |
| Surfynol 465 | 1 wt % |
| Ethanol | 3 wt % |
| Pure water | Balance |

Light-colored cyan ink 1

| | |
|---|---|
| C.I. Pigment Blue 15:3 | 0.3 wt % |
| Solsperse 27000 (nonionic dispersant) | 0.2 wt % |
| Diethylene glycol | 10 wt % |
| Surfynol TG | 1 wt % |
| Ammonium hydroxide | 1 wt % |
| Magnesium sulfate tetrahydrate (reactant) | 10 wt % |
| Pure water | Balance |

Black ink 1

| | |
|---|---|
| Carbon black Raven 1080 (manufactured by Columbian Carbon) | 5 wt % |
| Styrene/acrylic acid copolymer ammonium salt (anionic dispersant) | 1 wt % |
| Voncoat 4001 (acrylic resin emulsion, resin component 50%, MFT = 5° C., manufactured by Dainippon Ink and Chemicals, Inc.) | 4 wt % |
| Sucrose | 0.7 wt % |
| Maltitol | 6.3 wt % |
| Glycerin | 10 wt % |
| 2-Pyrrolidone | 2 wt % |
| Surfynol TG | 1 wt % |
| Pure water | Balance |

Black ink 2

| | |
|---|---|
| Carbon black MA 7 (manufactured by Mitsubishi Kasei Corp.) | 5 wt % |
| Solsperse 27000 (nonionic dispersant) | 1 wt % |
| Glycerin | 15 wt % |
| Surfynol TG | 1 wt % |
| Dan fix 723 (reactant) | 3 wt % |
| Potassium hydroxide | 1 wt % |
| Pure water | Balance |

Print Evaluation Test 1

Printing was carried out using ink sets 1 and 2 shown in the following table with ink jet printer MJ700V2C (manufactured by Seiko Epson Co., Ltd.) onto the following papers. In the printing, a solid image (100% duty) of a cyan ink, a magenta ink, or a yellow ink was printed, and, immediately after that, a letter was printed on the solid image using a black ink. In this case, simultaneous deposition of a yellow ink was always performed on a dot to which the black ink was to be deposited.

(1) Xerox P Paper (Xerox Corp.)
(2) Ricopy 6200 Paper (Ricoh Co. Ltd.)
(3) Xerox 4024 Paper (Xerox Corp.)
(4) Neenah Bond Paper (Kimberly-Clark)
(5) Xerox R Paper (Xerox Corp., recycled paper)
(6) Yamayuri (Honshu Paper Co., Ltd., recycled paper)

The letter with the black ink for each print was examined for uneven color mixing at its boundary areas. The results were evaluated according to the following criteria.

No color mixing with clear boundaries for all the test paper: excellent (A)

Color mixing in a feather form for any test paper: good (B)

Color mixing, for all the test papers, to such an extent that the outline of the letter is blurred: unacceptable (NG)

The results are summarized in the following table.

TABLE 1

| | Ink | Reactant | Bleeding |
|---|---|---|---|
| Ink set 1 | Yellow ink 1 | Polyvalent metal salt | A |
| | Magenta ink 1 | Polyvalent metal salt | A |
| | Cyan ink 3 | — | A |
| | Black ink 1 | — | — |
| Ink set 2 | Yellow ink 3 | — | A |
| | Magenta ink 3 | — | A |
| | Cyan ink 2 | Polyallylamine | A |
| | Black ink 2 | Polyallylamine | — |

Print Evaluation Test 2

Printing was carried out using ink sets 3, 4, 5, and 6 shown in the following table with ink jet printer MJ700V2C. A solid image (100% duty) of a cyan ink, a magenta ink, or a yellow ink was printed in the same papers as used in the print evaluation test 1. Further, immediately after that, a black letter was formed thereon by overprinting an cyan ink, a magenta ink, and a yellow ink. The black letter for each print was examined for uneven color mixing at its boundary areas. The results were evaluated according to the same criteria as used in the print evaluation test 1. The results are summarized in the following table.

TABLE 2

| | Ink | Reactant | Bleed |
|---|---|---|---|
| Ink set 3 | Yellow ink 1 | Polyvalent metal salt | A |
| | Magenta ink 3 | — | A |
| | Cyan ink 3 | — | A |
| Ink set 4 | Yellow ink 2 | Polyallylamine | A |
| | Magenta ink 2 | Polyallylamine | A |
| | Cyan ink 1 | — | A |
| Ink set 5 | Yellow ink 3 | — | B |
| | Magenta ink 2 | Polyallylamine | A |
| | Cyan ink 2 | Polyallylamine | A |
| Ink set 6 | Yellow ink 3 | — | B |
| | Magenta ink 3 | — | A |
| | Cyan ink 2 | Polyallylamine | A |

Print Evaluation Test 3

Printing was carried out using an ink set 7 shown in the following table with ink Jet printer MJ700V2C in the same manner as in the print evaluation test 1, except that a solid image of magenta was formed by overprinting a light-colored magenta ink and a magenta ink, a solid image of cyan was formed by overprinting a light-colored cyan ink and a cyan ink. Further, simultaneous deposition of a light-colored magenta ink was always performed on a dot to which the black ink was to be deposited. For each print, the letter formed using the black ink composition was examined for uneven color mixing at its boundary areas. The results were evaluated according to the same criteria as used in the print evaluation test 1. The results are summarized in the following table.

TABLE 3

|  | Ink | Reactant | Bleeding |
| --- | --- | --- | --- |
| Ink set 7 | Light-colored magenta ink 1 | Polyvalent metal salt | A |
|  | Light-colored cyan ink 1 | Polyvalent metal salt | A |
|  | Yellow ink 3 | — | A |
|  | Magenta ink 3 | — | A |
|  | Cyan ink 3 | — | A |
|  | Black ink 1 | — | — |

Print Evaluation Test 4

Printing was carried out using an ink set 8 shown in the following table with ink jet printer MJ700V2C in the same manner as in the print evaluation test 1, except that a solid image of magenta was formed by overprinting a light-colored magenta ink and a magenta ink and a blotted image of cyan was formed by overprinting a light-colored cyan ink and a cyan ink. Further, deposition of a yellow ink was not performed on a dot to which the black ink was to be deposited. For each print, the letter formed using the black ink composition was examined for uneven color mixing at its boundary areas. The results were evaluated according to the same criteria as used in the print evaluation test 1. The results are summarized in the following table.

TABLE 4

|  | Ink | Reactant | Bleeding |
| --- | --- | --- | --- |
| Ink set 8 | Light-colored magenta ink 1 | Polyvalent metal salt | A |
|  | Light-colored cyan ink 1 | Polyvalent metal salt | A |
|  | Yellow ink 1 | Polyvalent metal salt | A |
|  | Magenta ink 3 | — | A |
|  | Cyan ink 3 | — | A |
|  | Black ink 1 | — | — |

Print Evaluation Test 5

An ink set 9 specified in the following table was evaluated in the same manner as in the print evaluation test 1. The results are summarized in the following table.

TABLE 5

|  | Ink | Reactant | Bleeding |
| --- | --- | --- | --- |
| Ink set 9 | Yellow ink 1 | Polyvalent metal salt | A |
|  | Magenta ink 1 | Polyvalent metal salt | A |
|  | Cyan ink 4 | Polyvalent metal salt | A |
|  | Black ink 1 | — | — |

Test on Storage Stability of Inks

The ink compositions prepared above were placed in respective sample bottles, and the bottles were hermetically sealed and stored under an environment of 50° C. Three months after the initiation of the storage, the viscosity, the surface tension and PH of the inks were measured and found to be substantially the same as those before the storage.

What is claimed is:

1. An ink set comprising a yellow ink composition containing a yellow colorant, a magenta ink composition containing a magenta colorant, and a cyan ink composition containing a cyan colorant, the magenta ink composition and the cyan ink composition each comprising a resin emulsion, an inorganic oxide colloid or both, the yellow ink composition comprising a reactant which breaks the state of dispersion or dissolution of the colorant and the resin emulsion in the magenta ink composition and the cyan ink composition.

2. The ink set according to claim 1, which further comprises a black ink composition.

3. The ink set according to claim 2, wherein the black ink composition comprises a resin emulsion, an inorganic oxide colloid or both and the reactant can break the state of dispersion or dissolution of the colorant and the resin emulsion, the inorganic oxide colloid or both in the black ink composition.

4. The ink set according to claim 1, wherein the ink composition which comprises the reactant comprises a non-ionic dispersant.

5. The ink set according to claim 4, wherein the ink composition which is free form the reactant comprises an anionic dispersant.

6. The ink set according to claim 1, wherein the colorant is a pigment and the reactant is a polyvalent metal salt or a polyallylamine or a derivative thereof.

7. A recording method comprising the step of: depositing an ink composition onto a recording medium to conduct printing, wherein an ink composition in the ink set according to claim 1 is used as the ink composition.

8. The recording method according to claim 7, wherein the mass of the droplets of the ink compositions which comprise the reactant are less than 30 to 100% by weight of the mass of the droplets of the ink compositions which are free from the reactant.

9. A record produced by the recording method according to claim 7.

10. An ink jet recording method comprising the step of: ejecting and depositing droplets of an ink composition onto a recording medium to conduct printing, wherein an ink composition in the ink set according to claim 1 is used as the ink composition.

11. The ink jet recording method according to claim 10, wherein the mass of the droplets of the ink compositions ejected are such that a pixel formed by the ink composition which comprises the reactant is smaller than a pixel formed by the ink composition which is free from the reactant.

12. An ink set comprising a yellow ink composition containing a yellow colorant, a magenta ink composition containing a magenta colorant, and a cyan ink composition containing a cyan colorant, the cyan ink composition comprising a resin emulsion, an inorganic oxide colloid or both, the yellow ink composition and the magenta ink composition each comprising a reactant which breaks the state of dispersion or dissolution of the colorant and the resin emulsion in the cyan ink composition.

13. An ink set comprising a yellow ink composition containing a yellow colorant, a magenta ink composition having a lower color density containing a magenta colorant, a magenta ink composition having a higher color density containing a magenta colorant, a cyan ink composition having a lower color density containing a cyan colorant, and a cyan ink composition having a higher color density containing a cyan colorant, the magenta ink composition having a lower color density, and the cyan ink composition having a lower color density each comprising a reactant which breaks the state of dispersion or dissolution of the colorant in the yellow ink composition, the magenta ink composition having a higher color density and the cyan ink composition having a higher color density.

14. The ink set according to claim 13, wherein the yellow ink composition, the magenta ink composition having a higher color density and the cyan ink composition having a higher color density each comprising a resin emulsion, an inorganic oxide colloid or both, the reactant breaking the state of dispersion or dissolution of the resin emulsion, the inorganic oxide colloid or both.

15. An ink set comprising a yellow ink composition containing a yellow colorant, a magenta ink composition having a lower color density containing a magenta colorant, a magenta ink composition having a higher color density containing a magenta colorant, a cyan ink composition having a lower color density containing a cyan colorant, and a cyan ink composition having a higher color density containing a cyan colorant, the yellow ink composition, the magenta ink composition having a lower color density, and the cyan ink composition having a lower color density each comprising a reactant which breaks the state of dispersion or dissolution of the colorant in the magenta ink composition having a higher color density and the cyan ink composition having a higher color density.

16. The ink set according to claim 15, wherein the magenta ink composition having a higher color density and the cyan ink composition having a higher color density each comprising a resin emulsion, an inorganic oxide colloid or both, the reactant breaking the state of dispersion or dissolution of the resin emulsion, and/or the inorganic oxide colloid.

17. An ink set comprising a yellow ink composition containing a yellow colorant, a magenta ink composition containing a magenta colorant, a cyan ink composition containing a cyan colorant, and a black ink composition containing a black colorant, the black ink composition comprising a resin emulsion, an inorganic oxide colloid or both, the yellow ink composition, the magenta ink composition, and cyan ink composition each comprising a reactant which breaks the state of dispersion or dissolution of the colorant and the resin emulsion in the black ink composition.

* * * * *